(12) United States Patent
Petersen et al.

(10) Patent No.: US 9,261,084 B2
(45) Date of Patent: Feb. 16, 2016

(54) HYDRAULIC CONTROL ARRANGEMENT

(71) Applicant: Sauer-Danfoss ApS, Nordborg (DK)

(72) Inventors: Morten Hoeck Petersen, Soenderborg (DK); Bendt Porskrog, Nordborg (DK); Nils E. Sevelsted, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 167 days.

(21) Appl. No.: 14/151,913

(22) Filed: Jan. 10, 2014

(65) Prior Publication Data

US 2014/0196804 A1 Jul. 17, 2014

(30) Foreign Application Priority Data

Jan. 16, 2013 (EP) .................................... 13000214

(51) Int. Cl.
*B62D 5/32* (2006.01)
*B62D 5/093* (2006.01)
*F04B 7/02* (2006.01)

(52) U.S. Cl.
CPC . *F04B 7/02* (2013.01); *B62D 5/093* (2013.01); *B62D 5/32* (2013.01); *Y10T 137/86002* (2015.04); *Y10T 137/87193* (2015.04)

(58) Field of Classification Search
CPC ............ B62D 5/32; B62D 5/093; B62D 5/09; B62D 5/097; B62D 5/30; Y10T 137/86002; Y10T 137/86163; Y10T 137/8601; Y10T 137/87225; Y10T 137/87193
See application file for complete search history.

(56) References Cited

U.S. PATENT DOCUMENTS 3,705,493 A * 12/1972 Nelson ............................ 60/445
3,820,620 A * 6/1974 Miller ........................... 180/406
(Continued)

FOREIGN PATENT DOCUMENTS

| CN | 1206382 A | 1/1999 | |
|---|---|---|---|
| CN | 2402573 Y | 10/2000 | |
| DE | 3814508 A1 * | 11/1989 | ............... B62D 5/07 |

OTHER PUBLICATIONS

Machine translation of Soerensen (DE3814508A1 originally published on Nov. 9, 1989).*

(Continued)

*Primary Examiner* — Mary McManmon
*Assistant Examiner* — David Colon Morales
(74) *Attorney, Agent, or Firm* — McCormick, Paulding & Huber LLP

(57) ABSTRACT

A hydraulic control arrangement (1) is described having a directional valve (2), a metering pump unit which has at least two metering pumps (3, 4) which are connected hydraulically in parallel and are operable mechanically in parallel, and a shut-off valve (6) in hydraulic connection between two of the at least two metering pumps (3, 4), a pump connection (P) and a tank connection (T) which are connected to said metering pump unit by way of the directional valve (2), and two working connections (L, R) connected to the directional valve (2), a control input (8) of the shut-off valve (6) being connected to the pump connection (P) by means of a control valve. Such a control arrangement should be operated at a high hydraulic pressure and at the same time it should be made sure that the shut-off valve is actuated only when the required high pressure is available. To this end the control valve (10) is a pilot operated valve, an inlet (11) of said control valve (10) being connected to the pump connection (P), said control valve (10) connecting said input (8) and said pump connection (P) in an actuated state of said control valve (10).

9 Claims, 2 Drawing Sheets

(56) References Cited

U.S. PATENT DOCUMENTS

| | | | | |
|---|---|---|---|---|
| 3,859,791 | A * | 1/1975 | Allen et al. | 60/477 |
| 3,865,211 | A * | 2/1975 | Liebert et al. | 180/433 |
| 3,913,324 | A * | 10/1975 | Miller et al. | 60/405 |
| 3,915,253 | A * | 10/1975 | Ott et al. | 180/437 |
| 4,013,138 | A * | 3/1977 | McBurnett | 180/406 |
| 4,026,193 | A * | 5/1977 | Olmsted | 91/216 B |
| 4,028,997 | A * | 6/1977 | Lang | 91/517 |
| 4,076,096 | A * | 2/1978 | Hushower et al. | 180/406 |
| 4,142,842 | A * | 3/1979 | Hicks et al. | 417/288 |
| 4,356,759 | A * | 11/1982 | Ljubimov et al. | 91/31 |
| 4,574,904 | A * | 3/1986 | Goode | 180/406 |
| 4,723,409 | A * | 2/1988 | Kuhn | 60/422 |
| 4,723,475 | A * | 2/1988 | Burk | 91/434 |
| 4,798,050 | A * | 1/1989 | Nakamura et al. | 60/329 |
| 4,798,256 | A * | 1/1989 | Fassbender | 180/406 |
| 4,942,935 | A * | 7/1990 | Lech | 180/406 |
| 5,083,430 | A * | 1/1992 | Hirata et al. | 60/445 |
| 5,806,561 | A | 9/1998 | Pedersen et al. | |
| 5,826,676 | A * | 10/1998 | Ko | 180/403 |
| 6,016,656 | A * | 1/2000 | Sørensen | 60/384 |
| 6,408,977 | B1 | 6/2002 | Obertrifter et al. | |
| 6,484,840 | B1 * | 11/2002 | Sevelsted | 180/403 |
| 6,804,956 | B2 | 10/2004 | Pedersen et al. | |
| 7,152,401 | B2 * | 12/2006 | Soerensen | 60/386 |
| 7,185,730 | B2 * | 3/2007 | Schmidt et al. | 180/403 |
| 7,997,379 | B2 * | 8/2011 | Kryhlmand et al. | 180/441 |
| 2002/0088664 | A1 | 7/2002 | Juul et al. | |
| 2007/0017731 | A1* | 1/2007 | Soerensen | 180/441 |
| 2007/0251753 | A1* | 11/2007 | Clausen | 180/414 |
| 2009/0114469 | A1* | 5/2009 | Thomsen et al. | 180/441 |
| 2012/0199765 | A1* | 8/2012 | Hilzendegen et al. | 251/28 |
| 2012/0273700 | A1* | 11/2012 | Schmidt et al. | 251/25 |

OTHER PUBLICATIONS

European Search Report for Serial No. 13000214.0 dated Sep. 23, 2013.

* cited by examiner

HYDRAULIC CONTROL ARRANGEMENT

CROSS REFERENCE TO RELATED APPLICATION

Applicant hereby claims foreign priority benefits under U.S.C. §119 from European Patent Application No. 13000214.0.6 filed on Jan. 16, 2013, the contents of which are incorporated by reference herein.

TECHNICAL FIELD

The present invention relates to a hydraulic control arrangement having a directional valve, a metering pump unit which has at least two metering pumps which are connected hydraulically in parallel and are operable mechanically in parallel, and a shut-off valve in a hydraulic connection between two of the at least two metering pumps, a pump connection and a tank connection which are connected to said metering pump unit by way of the directional valve, and two working connections connected to the directional valve, a control input of the shut-off valve being connected to the pump connection by means of a control valve.

BACKGROUND

Such a hydraulic control arrangement having two metering pumps in the metering pump unit is known from U.S. Pat. No. 5,806,561 B. In a "normal" steering mode both metering pumps are connected hydraulically in parallel and are operated mechanically in parallel. In this mode of operation the metering pump unit has a rather large displacement. When the control arrangement is used as a steering unit in a vehicle, a small steering angle at the steering wheel causes a rather large steering angle at the steered wheels. In an "emergency" mode of operation it is possible to short circuit one steering pump so that only the remaining steering pump can work. In this mode of operation the torque produced by a driver to rotate the steering wheel can be reduced. However, a greater number of revolutions are necessary to get the desired steering angle of the steered wheels. The control valve can be used to switch between the two modes of operation even if there is no emergency case. The control valve can for example be controlled in dependency on speed or by the driver if he wishes to obtain more sensitive steering.

When the control valve is switched in normal mode the pump pressure has to exceed the force of a spring so that a valve element of the control valve can be moved in a position connecting the two metering pumps.

In hydraulic systems having a higher operating pressure it is in some cases difficult to get the desired switching behavior of the shut-off valve. For example, in some cases the shut-off valve should be switched to a state in which both metering pumps are connected in parallel only when the pump pressure exceeds 40-70 bar. Below this pressure level only one metering pump should meter out oil to the working connection.

SUMMARY

Therefore, the object underlying the invention is to make sure that the shut-off valve is switched under control conditions only.

This object is solved in a hydraulic control arrangement as described above in that the control valve is a pilot operated valve, an inlet of said control valve being connected to the pump connection, said control valve connecting said input and said pump connection in an actuated state of said control valve.

In such a hydraulic control arrangement the shut-off valve can connect the two metering pumps in parallel only when the pilot valve has been actuated. The pilot valve is actuated only if the pump pressure exceeds the required pressure level, e.g. 40-70 bar. Only after switching off the pilot valve the pump pressure can reach the inlet of the shut-off valve so that the shut-off valve is actuated. Pilot valves are known per se. They can be used without increasing dramatically the costs of the hydraulic control arrangement.

Preferably the control valve connects the input of the shut-off valve to the tank connection, if the control valve is in a non-actuated state. In this case the input of the shut-off valve is pressure released unless the pump pressure exceeds the required pressure value. The spring (or other reset forces) moving the shut-off valve in the "emergency" state in which only one of the metering pumps is active does not have to overcome hydraulic pressures caused by trapped hydraulic fluid. Such hydraulic fluid can escape to the tank connection.

Preferably the pressure at the inlet of the control valve acts on a valve element of the control valve against a force of a spring. The force of the spring defines the required pressure level at which the pilot valve changes its state to connect the pump connection to the input of the shut-off valve.

Preferably the valve element is moved in said actuated state when the pressure at the inlet exceeds 40 bar. A pressure level of 40 bar or more is a quite high level in a hydraulic control arrangement which can, however, be easily handled by using a pilot operated valve.

In this case it is preferred that the pump connection is connected to a constant pressure pump system. In such constant pump pressure system or CN-systems the pump pressure normally is permanently greater than 100 bar, when the engine of the vehicle to be steered by the hydraulic control arrangement is running. Such a high pressure can easily be handled by the use of a pilot operated valve.

In a further preferred embodiment the pressure at the inlet of the control valve acts on a valve element of the control valve against a force of a spring and a pressure at a load sensing connection. In this way it is possible to use the hydraulic control arrangement together with a LS or load sensing system. In such a system the pressure at the pump connection usually is higher by a predetermined amount than the pressure at the load sensing connection. The spring has a force being smaller than the force created by the pressure difference. Therefore, the pilot operated control valve is moved or shifted in a condition in which the two metering pumps are hydraulically connected in parallel. When the pressure at the pump connection decreases the pressure at the load sensing connection will decrease as well. However, this is true only in "normal" situations. When the pressure at the pump connection decreases further, for example, when the engine driving the pump does not operate, the pressure at the pump connection will not be able to create a force on the valve element of the control valve being higher than the force of the spring. The spring shifts the control valve in a condition in which only one of the metering pumps is active.

In this case it is preferred that the force of said spring corresponds to less than a nominal pressure difference between the pressure at the pump connection and the load sensing connection. In normal operating condition the force of this spring is overcome by the pressure difference. In an emergency situation the pressure at the pump connection disappears or drops to a value lower than the force of the spring.

Preferably a pressure at the input of the shut-off valve acts on a shut-off valve element against a force of a shut-off valve spring, the shut-off valve spring having a force corresponding to a pressure of not more than 8 bar. In this way a usual shut-off valve can be used as known from the prior art as described in U.S. Pat. No. 5,806,561 B or U.S. Pat. No. 6,804,956 B2. Only minor changes are necessary to adapt the known control arrangement to a high pressure system.

BRIEF DESCRIPTION OF THE DRAWINGS

Preferred embodiments of the invention will now be described in more detail with reference to the drawings, wherein.

DETAILED DESCRIPTION

Figure 1:
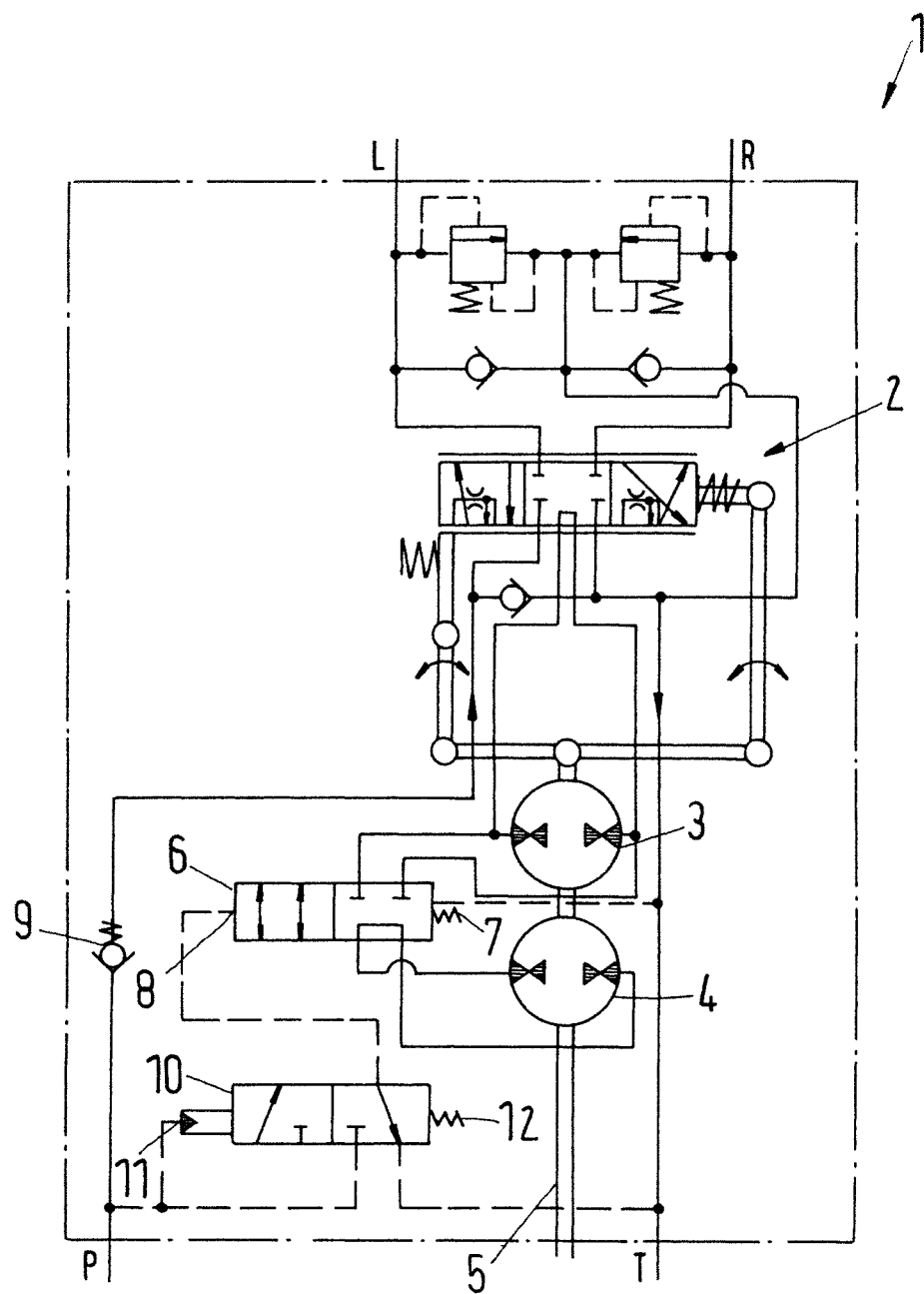
FIG. 1 is a schematic diagram of a first embodiment of the invention.

In both figures the same reference numerals are used for the same elements.

A hydraulic control arrangement 1 has a directional valve 2 and a metering pump unit having two metering pumps 3, 4. The metering pumps 3, 4 can be connected hydraulically in parallel. They are connected to a common steering shafts which can be actuated by a steering wheel (not shown). Furthermore, the steering shaft 5 is connected to the directional valve 2.

The control arrangement 1 comprises a pump connection P and a tank connection T. The pump connection P is connected to the directional valve 2. The tank connection T is connected to the directional valve 2 as well. Furthermore, the control arrangement 1 comprises two working connections L, R which are connected to the directional valve 2 as well. The two working connections can be connected to a steering motor, e.g. a steering cylinder (not shown).

A shut-off valve 6 is arranged between the two metering pumps 3, 4. The shut-off valve 6 is used to connect the two metering pumps 3, 4 hydraulically in parallel or, as shown, to interrupt a connection between the two metering pumps 3, 4 and to short circuit the metering pump 4.

The shut-off valve 6 comprises a shut-off valve spring 7 urging the shut-off valve 6 in the condition shown in FIG. 1 in which the connection between the two metering pumps 3, 4 is interrupted. Furthermore, the shut-off valve 6 is provided with a control input 8. The shut-off valve 6 switches in a condition in which the two metering pumps 3, 4 are connected hydraulically in parallel when the force generated by the pressure by the control input 8 exceeds the force of the shut-off valve spring 7.

The pump connection P is connected to the directional valve 2 via a check valve 9 opening in a direction towards the directional valve 2.

A control valve 10 is arranged between the pump connection P and the control input 8 of the shut-off valve 6. The control valve 10 is a pilot operated valve having an inlet 11 which is connected to the pump connection P. The control valve 10 furthermore comprises a spring 12. The force of the spring 12 acts in a direction opposite to a force created by the pressure at the inlet 11.

In the situation shown in FIG. 1 the force created by the spring 12 exceeds the force created by the pressure at the inlet 11. Therefore, the pilot operated control valve 10 interrupts the connection between the control input 8 of the shut-off valve 6 and the pump connection P. If the situation changes and the pressure at the inlet 11 creates a force exceeding the force of the spring 12, the pilot operated control valve 10 switches and connects the pump connection P to the control input 8. Only in this case the pressure at the pump connection P arrives at the shut-off valve 6 shifting it in an operating condition in which the two metering pumps 3, 4 are connected hydraulically in parallel.

The pump connection P is connected to a constant pump pressure system or CN system in which the pump pressure normally is permanently 100 bar, when the engine driving the pump is running.

At normal steering conditions and with normal pump supply both metering pumps 3, 4 are active and the overall displacement of the steering unit is the sum of the displacements of the two metering pumps 3, 4.

In hydraulic systems operating with a much lower pressure, when pump pressure drops to less than 6-7 bar the shut-off valve will switch over so that only oil from one metering pump 3 is lead to the working connections LR and so the driver will be able to manually build up the required steering pressure due to the lowest displacement of the entire steering unit. In this situation the chambers of the metering pump 4 are all connected to each other across the shut-off valve 6 so that no flow and pressure is built up from this metering pump 4.

Using the pilot operated control valve 11 it is possible to change the conditions. Now the pressure at the pump connection P must exceed a much higher pressure, for example 40-70 bar, before both metering pumps 3, 4 are in active steering mode. Below this pressure level only one metering pump 3 will meter out oil to the working connections.

This "high pressure shifting" works like this. The pilot operated control valve 10 with spring 12 will lead pump oil from the pump connection P to the shut-off valve 6, when the pressure on the pump connection P exceeds said 40-70 bar. For this purpose, a conventional pilot operated control valve 10 can be used.

The operation of the control arrangement 1 is known per se. When the steering shaft 5 is rotated, the directional valve 2 opens a path from the pump connection P to one of the two working connections L, R and another path from the working connection R, L to the tank connection. In most cases the directional valve 2 comprises two valve elements in form of concentric cylindrical bodies, usually referred to as spool and sleeve. The rotation of the steering shaft 5 causes a rotation between shaft and spool. When the hydraulic fluid passes through the metering pumps 3, 4, the metering pumps 3, 4 are driven rotating back sleeve and spool to their neutral position. Since this mode of operation is known per se, no further explanation is made.

Figure 2:
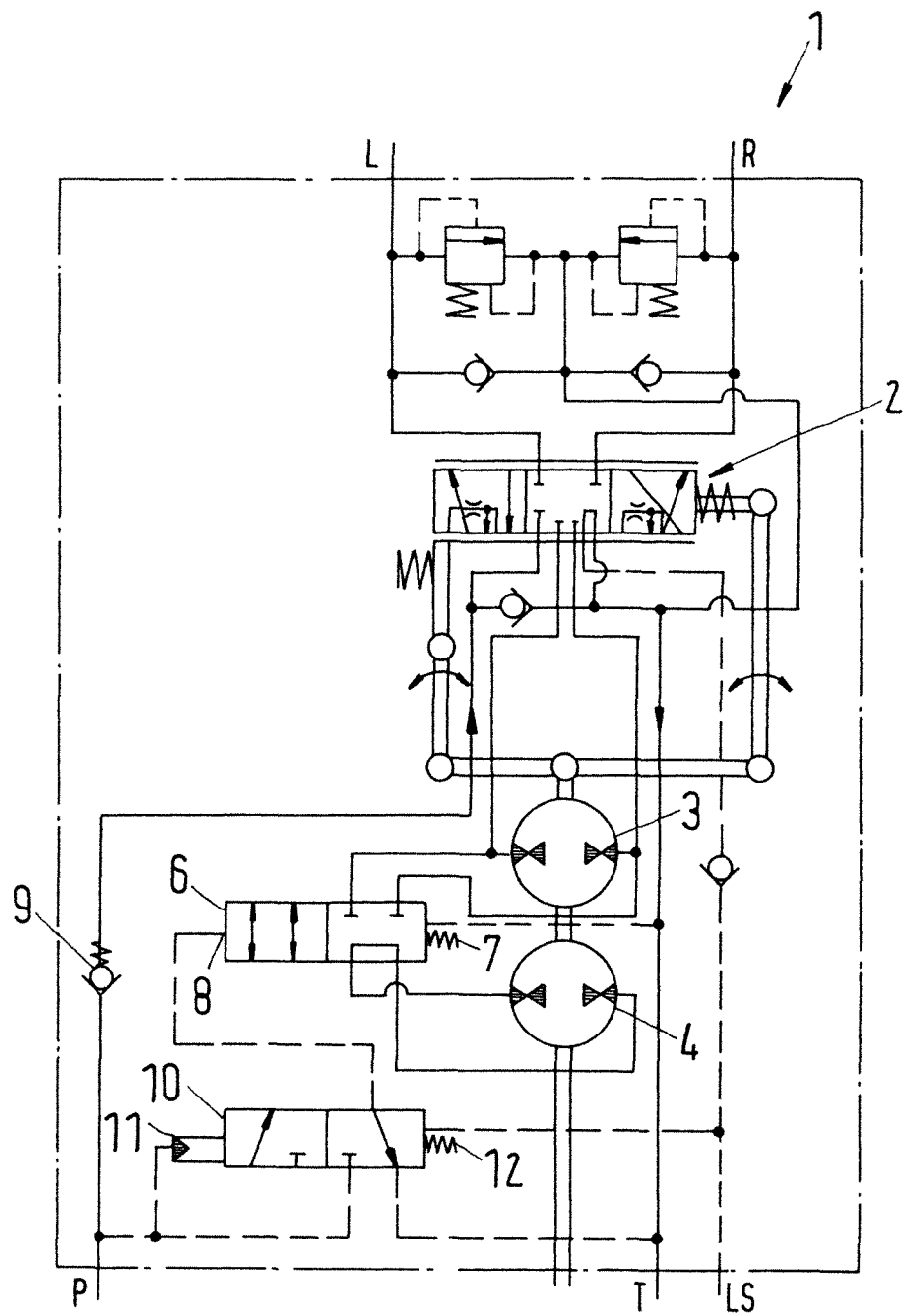
FIG. 2 is a schematic diagram of a second embodiment of the invention.

FIG. 2 shows another embodiment which can be used with a LS-system or load sensing system. As mentioned above, the same elements have the save reference numerals.

In addition to the embodiment of FIG. 1, a load sensing connection LS is provided at the control arrangement 1. The pilot operated control valve 10 is connected to the load sensing connection LS on the side on which the spring 12 is arranged.

The spring 12 creates a force on the pilot operated control valve 10 which is lower than a force created by the pressure difference between the pressures at the pump connection P and the load sensing connection LS.

In normal standby situations (pump running, no steering) and in normal situations standby pressure will be at a certain level, e.g. 10-12 bar. In other words, the difference between the pressure at the pump connection P and the pressure at the load sensing connection LS will be in the range of 10-12 bar.

The spring 12 has for example a nominal value of 4 bar. In this situation, the pilot operated control valve 10 is actuated to connect the pump connection P and the control input 8 of the shut-off valve 6 to connect hydraulically the two metering pumps 3, 4 in parallel. In this way both metering pumps 3, 4 will meter out oil to the working connections L, R.

When pump pressure disappears or drops to a level below requested steering pressure, i.e. the pressure at the pressure connection P minus the pressure at the load sensing connection LS will drop to a lower level than the spring force value of spring 12, the pilot operated control valve 10 will move to outlet position, connecting the control input 8 to the tank connection T and so the shut-off valve 6 will also move to outlet position. In this way, the metering pump 4 will be disconnected and emergency steering mode will be active.

While the present invention has been illustrated and described with respect to a particular embodiment thereof, it should be appreciated by those of ordinary skill in the art that various modifications to this invention may be made without departing from the spirit and scope of the present.

What is claimed is:

1. A hydraulic control arrangement having a directional valve, a metering pump unit which has at least two metering pumps which are connected hydraulically in parallel and are operable mechanically in parallel, and a shut-off valve in a hydraulic connection between two of the at least two metering pumps, a pump connection (P) and a tank connection (T) which are connected to said metering pump unit by way of the directional valve, and two working connections (L, R) connected to the directional valve, a control input of the shut-off valve being connected to the pump connection (P) by means of a control valve, wherein the control valve is a pilot operated valve, an inlet of said control valve being connected to the pump connection (P), said control valve connecting said input and said pump connection (P) in an actuated state of said control valve, and wherein the pressure at the inlet of the control valve acts on a valve element of the control valve against a force of a spring and a pressure at a load sensing connection (LS).

2. The arrangement according to claim 1, wherein the control valve connects the input of the shut-off valve to the tank connection (T), if the control valve is in a non actuated state.

3. The arrangement according to claim 1, wherein the valve element is moved in said actuated state when the pressure at the inlet exceeds 40 bar.

4. The arrangement according to claim 1, wherein the force of said spring applies a pressure less than a nominal pressure difference between the pressure at the pump connection (P) and the load sensing connection (LS).

5. The arrangement according to claim 1, wherein a pressure at the input of the shut-off valve acts on a shut-off valve element against a force of a shut-off valve spring, the shut-off valve spring applies a pressure of not more than 8 bar to a side of the shut-off valve element.

6. The arrangement according to claim 5, wherein the pump connection (P) is connected to a constant pressure system.

7. The arrangement according to claim 2, wherein a pressure at the input of the shut-off valve acts on a shut-off valve element against a force of a shut-off valve spring, the shut-off valve spring applies a pressure of not more than 8 bar to a side of the shut-off valve element.

8. The arrangement according to claim 5, wherein a pressure at the input of the shut-off valve acts on a shut-off valve element against a force of a shut-off valve spring, the shut-off valve spring applies a pressure of not more than 8 bar to a side of the shut-off valve element.

9. The arrangement according to claim 4, wherein a pressure at the input of the shut-off valve acts on a shut-off valve element against a force of a shut-off valve spring, the shut-off valve spring applies a pressure of not more than 8 bar to a side of the shut-off valve element.

* * * * *